(12) United States Patent
Li et al.

(10) Patent No.: US 12,487,472 B2
(45) Date of Patent: Dec. 2, 2025

(54) DRIVING METHOD FOR LIQUID CRYSTAL GRATING, AND DISPLAY APPARATUS AND DISPLAY METHOD FOR DISPLAY APPARATUS

(71) Applicant: BOE Technology Group Co., Ltd., Beijing (CN)

(72) Inventors: Xinkai Li, Beijing (CN); Lili Chen, Beijing (CN); Yaoyu Lv, Beijing (CN); Siyan Ma, Beijing (CN); Yan Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/832,943

(22) PCT Filed: Apr. 28, 2023

(86) PCT No.: PCT/CN2023/091502
§ 371 (c)(1),
(2) Date: Jul. 25, 2024

(87) PCT Pub. No.: WO2023/231674
PCT Pub. Date: Dec. 7, 2023

(65) Prior Publication Data
US 2025/0116879 A1    Apr. 10, 2025

(30) Foreign Application Priority Data

May 30, 2022   (CN) .......................... 202210614743.2

(51) Int. Cl.
*G02B 30/31*    (2020.01)
*G06F 3/01*    (2006.01)
(Continued)

(52) U.S. Cl.
CPC ............. *G02B 30/31* (2020.01); *G06F 3/013* (2013.01); *G06T 7/60* (2013.01); *G06T 7/74* (2017.01);
(Continued)

(58) Field of Classification Search
CPC ........... G02B 30/31; G06F 3/013; G06T 7/60; G06T 7/74; G06T 7/75; G06T 17/00;
(Continued)

(56) References Cited

U.S. PATENT DOCUMENTS 9,798,152 B2 * 10/2017 Yan .......................... G02B 30/27
10,887,584 B2 * 1/2021 Zhang ...................... G02F 1/29
(Continued)

FOREIGN PATENT DOCUMENTS

CN         1737638 A      2/2006
CN       106056092 A     10/2016
(Continued)

OTHER PUBLICATIONS

PCT/CN2023/091502 international search report dated Aug. 7, 2023.
CN 202210614743.2 first office action dated Mar. 11, 2025.

*Primary Examiner* — Benyam Ketema
(74) *Attorney, Agent, or Firm* — IPro, PLLC

(57) ABSTRACT

Provided in the present disclosure are a driving method for a liquid crystal grating, and a display apparatus and a display method for a display apparatus. The driving method for a liquid crystal grating comprises: determining the real-time position of the center of a pupil; according to the real-time position, and a pre-established correspondence between the position of the center of the pupil and the position of a light-transmitting region in a liquid crystal grating, determining the position of the light-transmitting region in the liquid crystal grating that corresponds to the real-time posi- (Continued)

tion; and driving the liquid crystal grating, such that the liquid crystal grating only transmits light at the position of the light-transmitting region that corresponds to the real-time position.

16 Claims, 9 Drawing Sheets

(51) Int. Cl.
    *G06T 7/60*         (2017.01)
    *G06T 7/73*         (2017.01)
    *G06T 17/00*       (2006.01)
    *G09G 3/00*       (2006.01)
    *G09G 3/34*       (2006.01)

(52) U.S. Cl.
    CPC ................ *G06T 7/75* (2017.01); *G06T 17/00* (2013.01); *G09G 3/003* (2013.01); *G09G 3/3406* (2013.01); *G06T 2207/10048* (2013.01); *G06T 2207/30201* (2013.01); *G09G 2354/00* (2013.01)

(58) Field of Classification Search
    CPC ........... G06T 2207/10048; G06T 2207/30201; G09G 3/003; G09G 3/3406; G09G 2354/00
    See application file for complete search history.

(56) References Cited

U.S. PATENT DOCUMENTS

| | | | |
|---|---|---|---|
| 11,809,623 B2 * | 11/2023 | Koo | G06T 19/006 |
| 2005/0200781 A1 * | 9/2005 | Takatani | G02B 30/27 |
| | | | 349/122 |
| 2006/0139447 A1 * | 6/2006 | Unkrich | H04N 13/31 |
| | | | 348/42 |
| 2011/0261169 A1 * | 10/2011 | Tin | H04N 13/324 |
| | | | 345/589 |
| 2012/0229431 A1 * | 9/2012 | Hiroki | G09G 3/003 |
| | | | 345/204 |
| 2012/0262451 A1 * | 10/2012 | Kotani | H04N 13/341 |
| | | | 359/466 |
| 2013/0077037 A1 * | 3/2013 | Xie | G02F 1/13439 |
| | | | 349/143 |
| 2013/0169529 A1 * | 7/2013 | Ek | H04N 13/376 |
| | | | 345/697 |
| 2014/0063383 A1 * | 3/2014 | Xie | G02B 30/34 |
| | | | 349/139 |
| 2015/0346498 A1 * | 12/2015 | Zhong | H04N 13/31 |
| | | | 362/19 |
| 2019/0121427 A1 * | 4/2019 | Qin | G06F 3/013 |
| 2019/0353915 A1 * | 11/2019 | Zhang | G02F 1/13394 |
| 2020/0326536 A1 * | 10/2020 | Koo | G06V 20/20 |
| 2023/0070385 A1 * | 3/2023 | Koo | G06F 3/016 |

FOREIGN PATENT DOCUMENTS

| | | |
|---|---|---|
| CN | 106918956 A | 7/2017 |
| CN | 107515474 A | 12/2017 |
| CN | 107529055 A | 12/2017 |
| CN | 109165630 A | 1/2019 |
| CN | 114898440 A | 8/2022 |
| JP | 2000295637 A | 10/2000 |
| JP | 2005107545 A | 4/2005 |
| KR | 20130027331 A | 3/2013 |

* cited by examiner

Establishing a coordinate system of the liquid crystal grating by using a center of the liquid crystal grating as an origin of coordinates, a light emergent direction of the liquid crystal grating as a Z-axis positive direction, and an X-axis negative direction of the camera coordinate system as an X-axis positive direction — S701

Determining light-transmitting areas in different positions in the liquid crystal grating corresponding to different positions of the center of the pupil under the coordinate system of the liquid crystal grating — S702

Fig. 7

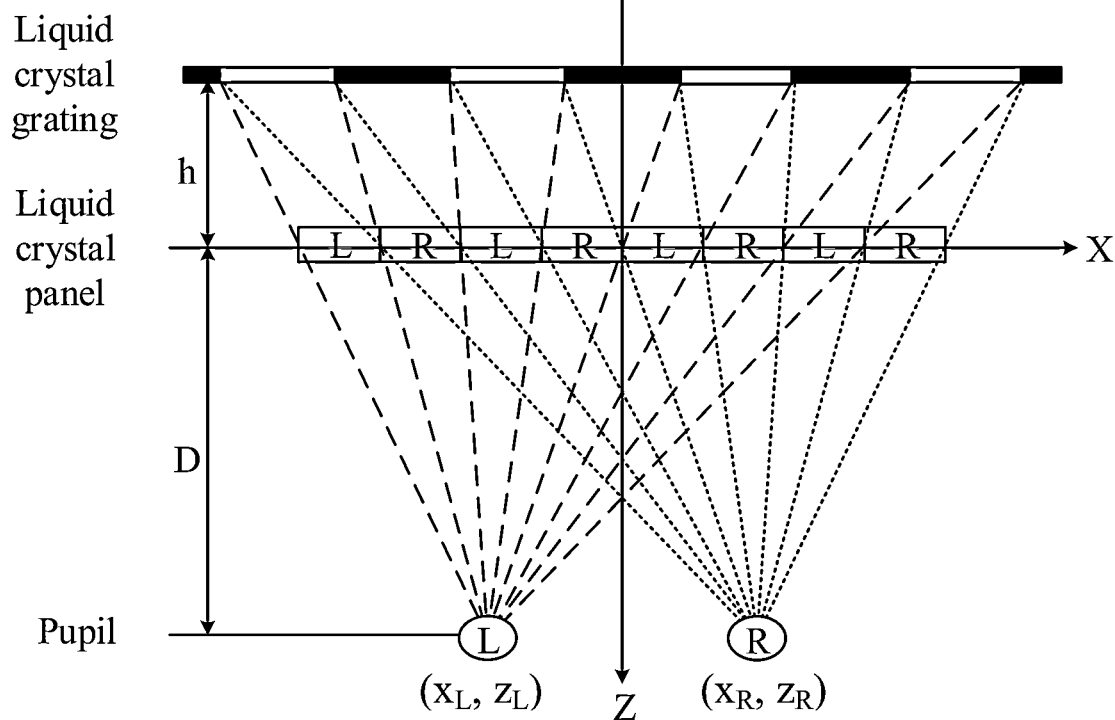

Fig. 8

Using a negative value of a coordinate x of the center of the pupil under the camera coordinate system determined in real time as a coordinate x of the center of the pupil under the coordinate system of the liquid crystal grating, and a coordinate z of the center of the pupil under the camera coordinate system determined in real time as a coordinate z of the center of the pupil under the coordinate system of the liquid crystal grating ⸺ S901

Judging whether the coordinate z of the center of the pupil under the coordinate system of the liquid crystal grating is equal to a preset best viewing distance; if yes, moving the light-transmitting area in an X-axis direction of the coordinate system of the liquid crystal grating, a size of the light-transmitting area after moving being the same as a size of the light-transmitting area before moving; if not, adjusting a size of the light-transmitting area in the X-axis direction of the coordinate system of the liquid crystal grating, the light-transmitting area after adjusting overlapping partially with the light-transmitting area before adjusting ⸺ S902

Fig. 9

DRIVING METHOD FOR LIQUID CRYSTAL GRATING, AND DISPLAY APPARATUS AND DISPLAY METHOD FOR DISPLAY APPARATUS

CROSS-REFERENCE TO RELATED APPLICATIONS

The present application is a National Stage of International Application No. PCT/CN2023/091502, filed on Apr. 28, 2023, which claims priority to Chinese Patent Application No. 202210614743.2, filed to China National Intellectual Property Administration on May 30, 2022, the entire content of which are incorporated herein by reference.

TECHNICAL FIELD

The present disclosure relates to the technical field of display, in particular to a driving method for a liquid crystal grating, and a display apparatus and a display method for the display apparatus.

BACKGROUND

With continuous development of a display technology, a three dimensional (3D) display technology is of more and more interest. A working principle of the three dimensional display technology is: as for the same scene, a left eye and a right eye of a viewer each receive an image, a distance (namely, a pupil distance) between the two eyes of the viewer in a horizontal direction is about 65 mm, so a delicate difference exists between viewing angles of the two eyes, then a slight difference (namely, a binocular parallax) also exists between respective images viewed by the left eye and the right eye of the viewer due to existence of the delicate difference, and a stereoscopic effect is formed after a left eye image and a right eye image are subjected to overlay and fusion via a visual cortex.

SUMMARY

The present disclosure provides a driving method for a liquid crystal grating, and a display apparatus and a display method for the display apparatus. A specific solution is as follows.

In an aspect, an embodiment of the present disclosure provides a driving method for a liquid crystal grating, including: determining a real-time position of a center of a pupil; determining a position of a light-transmitting region, that corresponds to the real-time position, in the liquid crystal grating according to the real-time position, and a pre-established correspondence between positions of the center of the pupil and positions of a light-transmitting region in the liquid crystal grating; and driving the liquid crystal grating to cause the liquid crystal grating only transmits light at the position of the light-transmitting region that corresponds to the real-time position.

In some embodiments, in the above driving method provided by the embodiment of the present disclosure, the determining a real-time position of a center of a pupil includes: capturing a face image of a user in real time, and determining three dimensional coordinates of the center of the pupil under a camera coordinate system based on the face image.

In some embodiments, in the above driving method provided by the embodiment of the present disclosure, the capturing a face image of a user in real time, and determining three dimensional coordinates of the center of the pupil under a camera coordinate system based on the face image includes: capturing face images in real time respectively by using visible light cameras that are located in different positions; respectively extracting a plurality of first edge points of an iris in the face images captured simultaneously by the visible light cameras, and performing matching on the first edge points at the same positions in the face images; calculating three dimensional coordinates of successfully matched first edge points under the camera coordinate system by using a triangulation method; and using the three dimensional coordinates of a center of a mapping space of the first edge points under the camera coordinate system as the three dimensional coordinates of the center of the pupil under the camera coordinate system.

In some embodiments, in the above driving method provided by the embodiment of the present disclosure, the capturing a face image of a user in real time, and determining three dimensional coordinates of the center of the pupil under a camera coordinate system based on the face image includes: obtaining the face image of the user in real time by using an infrared camera; extracting a plurality of first edge points of an iris in the face image, performing ellipse fitting on the plurality of first edge points, and using two dimensional coordinates of an ellipse center obtained by fitting under an image coordinate system as two dimensional coordinates of the center of the pupil under the image coordinate system; obtaining a plurality of face feature points in the face image, and mapping the plurality of face feature points to the same positions on a pre-established three dimensional face model; adjusting a coordinate system of the three dimensional face model to coincide with the camera coordinate system; using a mean value or a mode number of depth coordinates of a plurality of second edge points of human eyes in the three dimensional face model under the camera coordinate system as depth coordinates of the center of the pupil under the camera coordinate system; and transforming the two dimensional coordinates of the center of the pupil under the image coordinate system to be two dimensional coordinates of the center of the pupil in the same dimension under the camera coordinate system, the two dimensional coordinates of the center of the pupil under the camera coordinate system and the depth coordinates of the center of the pupil under the camera coordinate system constituting the three dimensional coordinates of the center of the pupil under the camera coordinate system.

In some embodiments, in the above driving method provided by the embodiment of the present disclosure, establishing a three dimensional face model includes: capturing at least one face image by using the visible light cameras; obtaining a plurality of face feature points of each face image; calculating three dimensional coordinates of the plurality of face feature points under the camera coordinate system by using the triangulation method; using one of the face feature points as an origin of a coordinate system of a to-be-established three dimensional face model, and adjusting the origin of the coordinate system of the to-be-established three dimensional face model to coincide with an origin of the camera coordinate system to cause that three dimensional coordinates of the plurality of face feature points under the camera coordinate system are transformed to be three dimensional coordinates under the coordinate system of the to-be-established three dimensional face model; and restoring a stereoscopic face represented by the plurality of face feature points according to the three dimensional coordinates of the plurality of face feature points under the coordinate system of the to-be-established three dimensional face model to implement establishment of the three dimensional face model.

In some embodiments, in the above driving method provided by the embodiment of the present disclosure, establishing correspondence between positions of the center of the pupil and positions of a light-transmitting region in the liquid crystal grating includes: establishing a coordinate system of the liquid crystal grating by using a center of the liquid crystal grating as an origin of coordinates, a light emergent direction of the liquid crystal grating as a Z-axis positive direction, and an X-axis negative direction of the camera coordinate system as an X-axis positive direction; and determining light-transmitting regions in different positions in the liquid crystal grating corresponding to different positions of the center of the pupil under the coordinate system of the liquid crystal grating.

In some embodiments, in the above driving method provided by the embodiment of the present disclosure, the determining a position of a light-transmitting region, that corresponds to the real-time position, in the liquid crystal grating according to the real-time position, and a pre-established correspondence between positions of the center of the pupil and positions of a light-transmitting region in the liquid crystal grating includes: using a negative value of a coordinate x of the center of the pupil under the camera coordinate system determined in real time as a coordinate x of the center of the pupil under the coordinate system of the liquid crystal grating, and a coordinate z of the center of the pupil under the camera coordinate system determined in real time as a coordinate z of the center of the pupil under the coordinate system of the liquid crystal grating; and judging whether the coordinate z of the center of the pupil under the coordinate system of the liquid crystal grating is equal to a preset best viewing distance; if yes, moving the light-transmitting region in an X-axis direction of the coordinate system of the liquid crystal grating, a size of the light-transmitting region after moving being the same as a size of the light-transmitting region before moving; if not, adjusting a size of the light-transmitting region in the X-axis direction of the coordinate system of the liquid crystal grating, a position of the light-transmitting region after adjusting overlapping partially with a position of the light-transmitting region before adjusting.

In some embodiments, in the above driving method provided by the embodiment of the present disclosure, the moving the light-transmitting region in an X-axis direction of the coordinate system of the liquid crystal grating includes: detecting coordinates of an intersection point between a connecting line extending line of a coordinate point of the center of the pupil and an origin under the coordinate system of the liquid crystal grating, and the liquid crystal grating; and comparing a coordinate x of the coordinates of the intersection point with a same-side endpoint coordinate of each strip electrode on an X axis in the liquid crystal grating within one period, and determining a region where an $i^{th}$ to $[(i+n/2)-1]^{th}$ strip electrodes within each period is located as a light-transmitting region corresponding to a current center of the pupil in the case that the coordinate x of the coordinates of the intersection point is greater than an endpoint coordinate of an $(i-1)^{th}$ strip electrode within one period and less than or equal to an endpoint coordinate of an $i^{th}$ strip electrode, n being the total number of strip electrodes within one period and being an even number, and i being an integer greater than or equal to 2 and less than or equal to n/2.

In some embodiments, in the above driving method provided by the embodiment of the present disclosure, the adjusting the size of the light-transmitting region in the X-axis direction of the coordinate system of the liquid crystal grating includes: calculating position coordinates of each strip electrode on an X axis within a total of m periods, a coordinate range on the X axis of a light transmittable region corresponding to each left eye pixel in the liquid crystal grating, and a coordinate range on the X axis of a light transmittable region corresponding to each right eye pixel in the liquid crystal grating; and comparing position coordinates of a $b^{th}$ strip electrode within an $a^{th}$ period with the coordinate range of the light transmittable region corresponding to the left eye pixel and the coordinate range of the light transmittable region corresponding to the right eye pixel, and determining a region where the $b^{th}$ strip electrode within the $a^{th}$ period is located as a light-transmitting region corresponding to a current center of the pupil in the case that the position coordinates of the $b^{th}$ strip electrode within the $a^{th}$ period are located in both the coordinate range of the light transmittable region corresponding to the left eye pixel and the coordinate range of the light transmittable region corresponding to the right eye pixel, m being the total number of grating periods in the liquid crystal grating, a being an integer greater than or equal to 1 and less than or equal to m, and b being an integer greater than or equal to 1 and less than or equal to n.

In another aspect, an embodiment of the present disclosure provides a display apparatus, including a backlight source, a liquid crystal panel located on a light emergent side of the backlight source, and a liquid crystal grating located between the backlight source and the liquid crystal panel, the liquid crystal grating being driven by using the above driving method provided by the embodiment of the present disclosure.

In another aspect, an embodiment of the present disclosure provides a display method for the above display apparatus, including: controlling a liquid crystal grating to transmit light completely in a two dimensional display mode; and controlling the liquid crystal grating to form a light-transmitting region and a light-shading region that are distributed alternately by using the above driving method in a three dimensional display mode.

In some embodiments, while adjusting the size of the light-transmitting region in the X-axis direction of the coordinate system of the liquid crystal grating, the above display method provided by the embodiment of the present disclosure further includes: determining the total number of strip electrodes corresponding to the light-transmitting region, and adjusting a backlight brightness emitted by a backlight source based on the total number of strip electrodes, the backlight brightness being in a negative correlation with the total number of strip electrodes.

BRIEF DESCRIPTION OF FIGURES

FIG. 7 is a flowchart of establishing a correspondence between different positions of a center of a pupil and different positions of a light-transmitting region in a liquid crystal grating provided by an embodiment of the present disclosure.

FIG. 8 is a schematic diagram of establishing a coordinate system of a liquid crystal grating provided by an embodiment of the present disclosure.

FIG. 9 is a flowchart of determining a position of a light-transmitting region in a liquid crystal grating that corresponds to a real-time position of a center of a pupil provided by an embodiment of the present disclosure.

DETAILED DESCRIPTION

Figure 1:
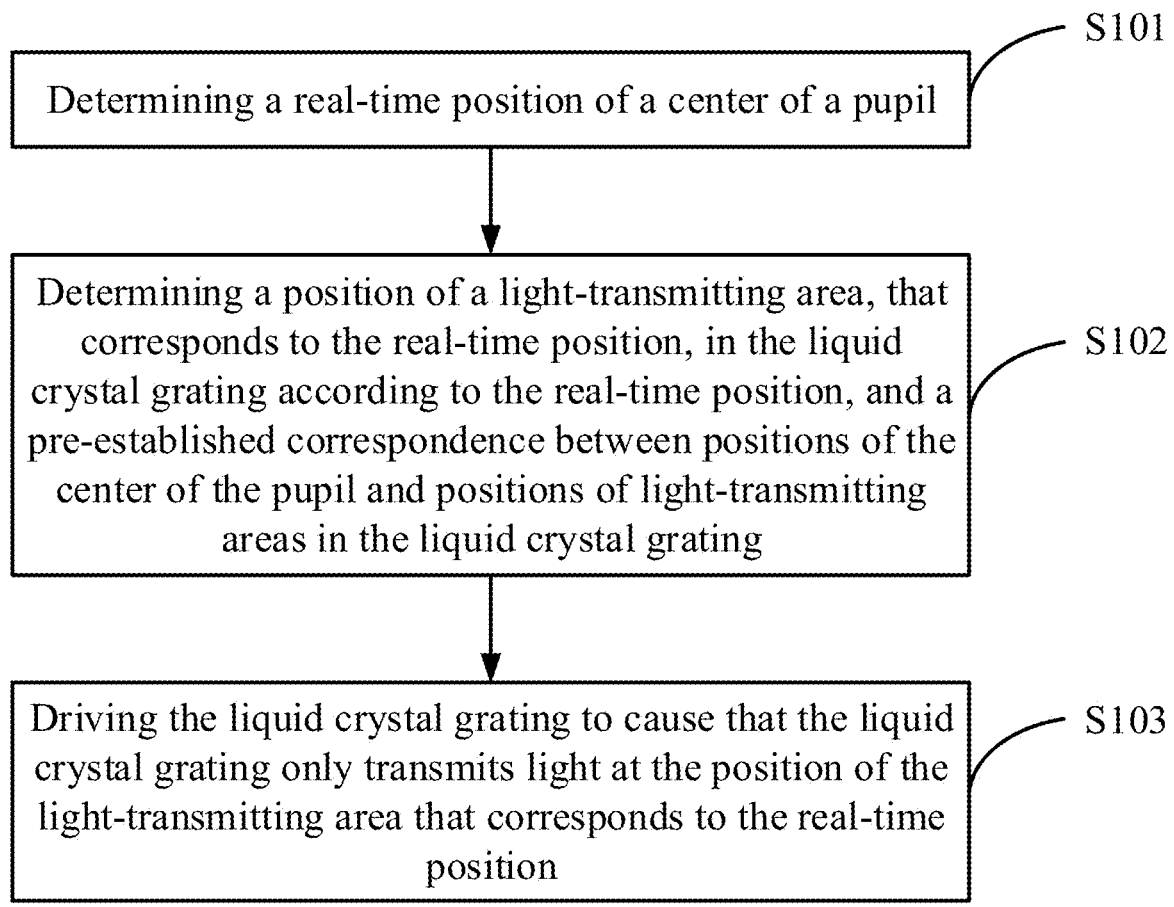
FIG. 1 is a flowchart of a driving method for a liquid crystal grating provided by an embodiment of the present disclosure.

In order to make objectives, technical solutions and advantages of the embodiments of the present disclosure clearer, the technical solutions of the embodiments of the present disclosure are clearly and completely described in the following with reference to accompanying drawings of the embodiments of the present disclosure. It is to be noted that a size and a shape of each figure in the accompanying drawings do not reflect a true scale and are only intended to illustrate contents of the present disclosure. The same or similar reference numerals represent the same or similar elements or elements with the same or similar functions all the time. In order to keep the following descriptions of the embodiments of the present disclosure clear and concise, detailed description of known functions and known components are omitted in the present disclosure.

Unless otherwise defined, technical or scientific terms used herein are supposed to have common meanings as understood by those ordinarily skilled in the art to which the present disclosure pertains. "First", "second" and similar words used in the specification and the claims of the present disclosure do not represent any sequence, quantity or significance and are only used for distinguishing different components. "Include", "comprise" or similar words means that an element or an item preceding the word covers an element or an item or its equivalents listed after the word without excluding other elements or items. "Inner", "outer", "upper", "lower" and the like are only used for representing a relative position relationship, and the relative position relationship may also change correspondingly after an absolute position of a described object changes.

A glasses-free 3D display technology is a display technology for obtaining a lifelike stereoscopic image with space and depth by using a characteristic of a parallax of two eyes without any assistant equipment (e.g., 3D glasses). As a stereoscopic image displayed by a glasses-free 3D display apparatus has advantages of real and lifelike expressive force, good environment appealing and strong visual impact, application scenes of the glasses-free 3D display apparatus are wider and wider.

The related glasses-free 3D display technology is mainly a stereoscopic display mode based on a viewing point, and its optical splitter mainly includes a light barrier type and a cylindrical lens type. The optical splitter of the light barrier type may be a liquid crystal grating, the liquid crystal grating includes a first substrate and a second substrate opposite to each other, and a liquid crystal layer located between the first substrate and the second substrate, a plurality of strip electrodes are arranged on a side of the first substrate facing the liquid crystal layer, a planar electrode is arranged on a side of the second substrate facing the liquid crystal layer, and a light-transmitting region and a light-shading region may be formed alternately in the liquid crystal grating in a manner of loading voltages to the planar electrode and some of the strip electrodes. As the liquid crystal grating and a liquid crystal panel have good compatibility, application of the glasses-free 3D display technology based on the liquid crystal grating is wider and wider, for example, fields of entertainment, education, vehicle mounting, medical care and the like have related demands. Due to limitation by a fixed viewing angle and a viewing distance, popularization and application of the glasses-free 3D display technology based on the liquid crystal grating are affected greatly.

In order to solve the above technical problems in the related art, an embodiment of the present disclosure provides a driving method for a liquid crystal grating, as shown in FIG. 1, including: S101, a real-time position of a center of a pupil is determined; S102, a position of a light-transmitting region in the liquid crystal grating that corresponds to the real-time position is determined according to the real-time position, and a pre-established correspondence between positions of the center of the pupil and positions of a light-transmitting region in the liquid crystal grating; and S103, the liquid crystal grating is driven, such that the liquid crystal grating only transmits light at the position of the light-transmitting region that corresponds to the real-time position.

In the above driving method for the liquid crystal grating provided by the embodiment of the present disclosure, after determining the real-time position of the center of the pupil, and determining the position of the light-transmitting region, that corresponds to the real-time position, in the liquid crystal grating according to the real-time position, and the pre-established correspondence between the positions of the center of the pupil and the positions of the light-transmitting region in the liquid crystal grating, the liquid crystal grating is controlled to only transmit light at the position of the light-transmitting region that corresponds to the real-time position, so a user can view a 3D image in different distances and at different viewing angles, thus limitation of the glasses-free 3D apparatus only capable of viewing at a fixed viewing angle and in a fixed distance is lifted, and popularization and application of the glasses-free 3D display technology based on the liquid crystal grating are better implemented.

In some embodiments, in the above driving method provided by the embodiment of the present disclosure, the step S101: determining a real-time position of a center of a pupil may be implemented specifically in the following mode: capturing a face image of a user in real time, and determining three dimensional coordinates of the center of the pupil under a camera coordinate system based on the face image, so as to implement accurate positioning of the center of the pupil.

Figure 2:
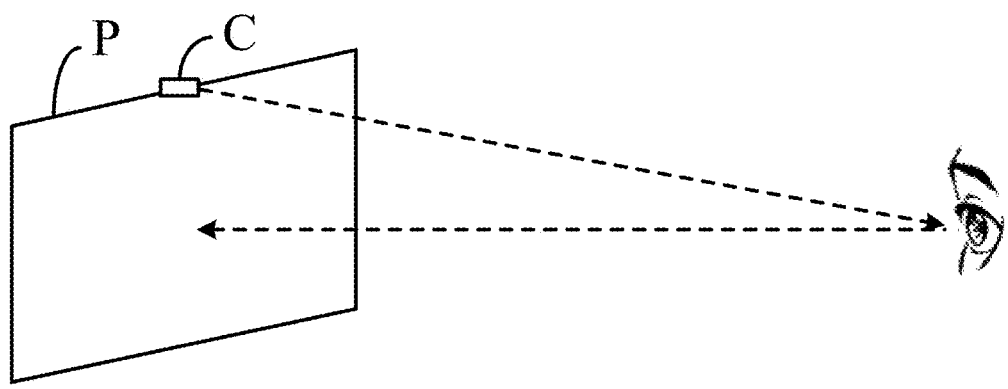
FIG. 2 is a schematic diagram of capturing a face image provided by an embodiment of the present disclosure.
Figure 3:
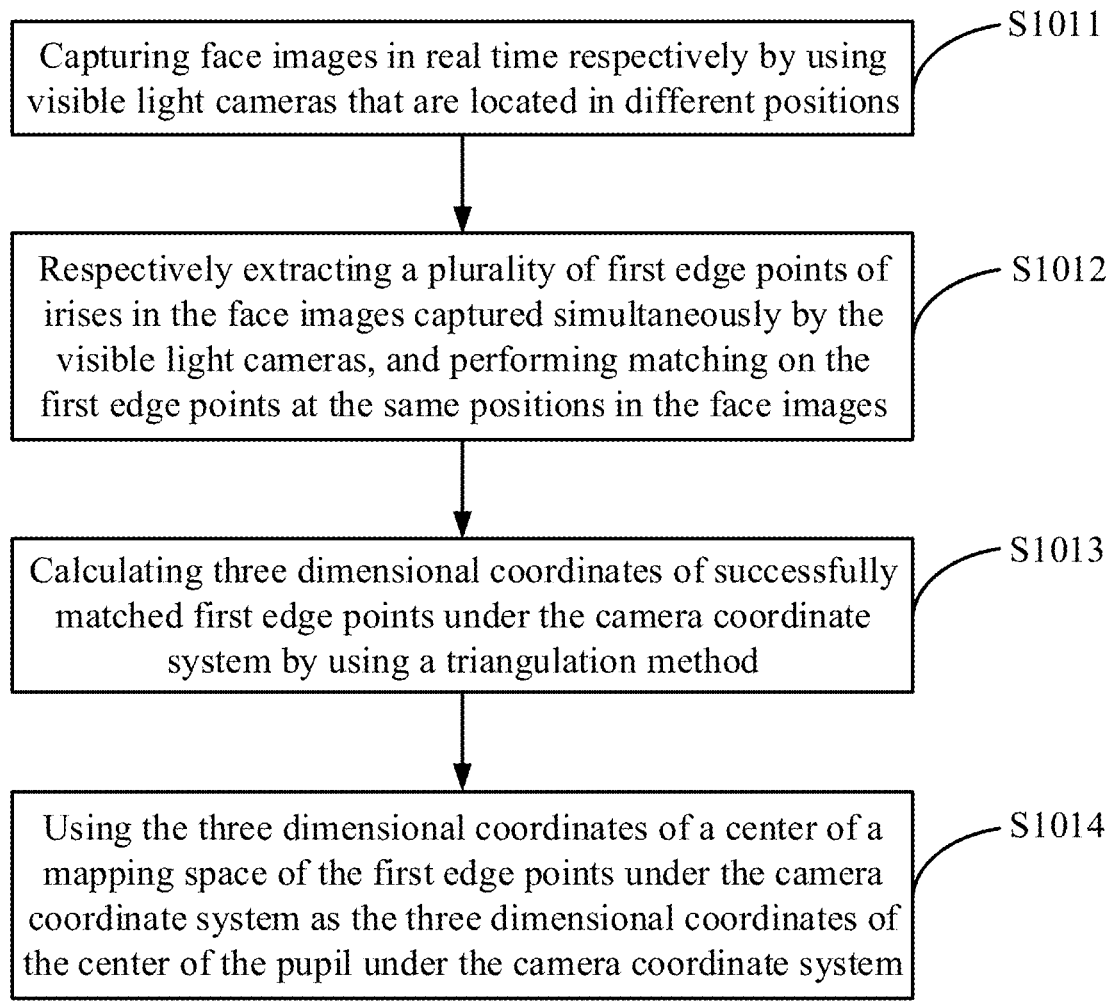
FIG. 3 is a flowchart of determining a real-time position of a center of a pupil provided by an embodiment of the present disclosure.

A visible image usually has a high spatial resolution (namely, a smallest identifiable detail in the image), is capable of presenting more detailed information, and has a good light and shade contrast effect, so the visible image is suitable for human visual perception. Based on this, in some embodiments, as shown in FIG. 2, the face image of the user may be captured through an imaging element C, for example, a visible light (RGB) camera, etc. In this case, the above step: capturing a face image of a user in real time, and determining three dimensional coordinates of the center of the pupil under a camera coordinate system based on the face image may be implemented specifically through steps shown in FIG. 3.

S1011, face images are captured in real time respectively by using visible light cameras that are located in different positions.

Figure 4:
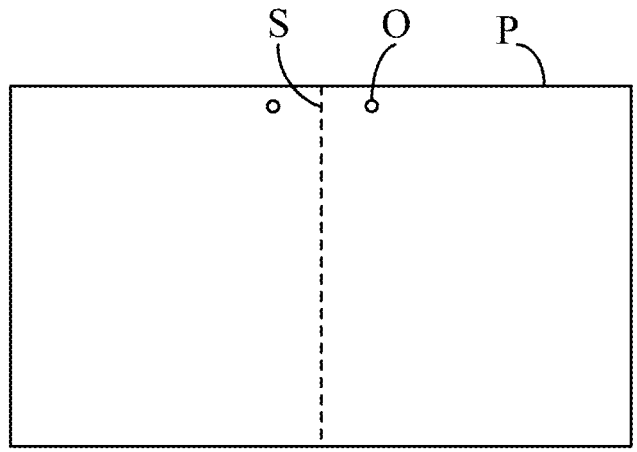
FIG. 4 is a schematic structural diagram of a display apparatus provided by an embodiment of the present disclosure.

Exemplarily, as shown in FIG. 4, there may be 2 visible light cameras, the 2 visible light cameras may be symmetrically distributed on two sides of a central axis S of a liquid crystal panel P, and correspondingly, optical centers O of the 2 cameras may be in symmetry with respect to the central axis S of the liquid crystal panel P.

S1012, a plurality of first edge points of an iris in the face images captured simultaneously by the visible light cameras are extracted respectively, and matching is performed on the first edge points at the same positions in the face images. A case that a certain same position of the iris in the different face images has the first edge points is regarded as successful matching of the first edge points of the iris at this position in the different images, and all the successfully matched first edge points constitute an edge of the iris.

S1013, three dimensional coordinates of the successfully matched first edge points under the camera coordinate system are calculated by using a triangulation method, which is equivalent to transforming two dimensional coordinates of the first edge points of the iris under an image coordinate system to be three dimensional coordinates under the camera coordinate system. Triangulation is a method for further solving a 3D position of a point while a plurality of camera positions and a projective point of the point in a space are known in visual positioning.

S1014, the three dimensional coordinates of a center of a mapping space of the first edge points under the camera coordinate system are used as the three dimensional coordinates of the center of the pupil under the camera coordinate system. Under normal circumstances, the iris and the pupil are not concentric circles exactly, but in general, their circle centers are very close, so the circle centers are regarded as the same approximately, and the center of the pupil may be found by positioning a center of the iris. Therefore, the three dimensional coordinates of each first edge point a center of a mapping space of the first edge points under the camera coordinate system may be used as the three dimensional coordinates of the center of the pupil under the camera coordinate system.

Figure 5:
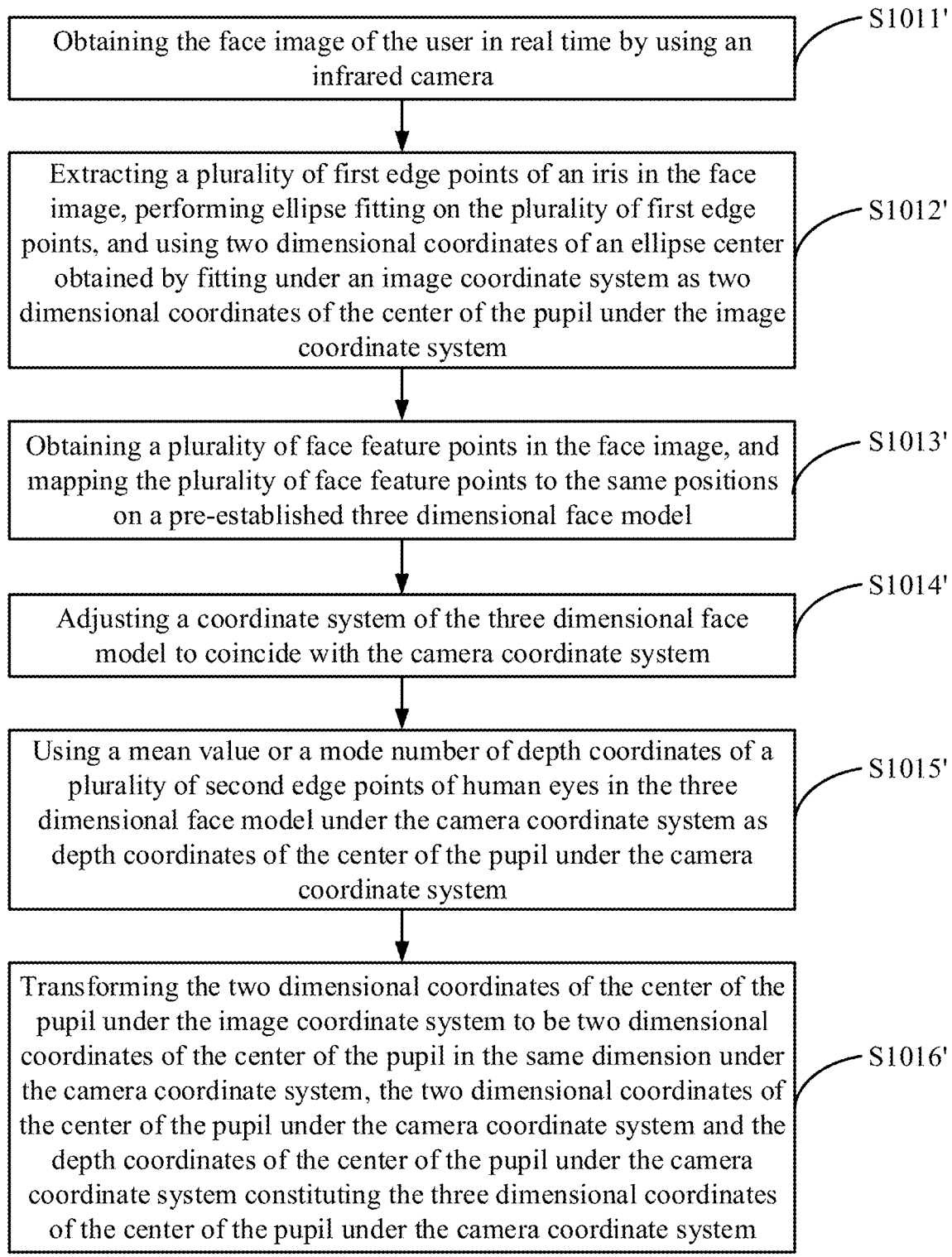
FIG. 5 is another flowchart of determining a real-time position of a center of a pupil provided by an embodiment of the present disclosure.

In view of influence on a visible image in some adverse conditions (such as strong light and mist), an ideal visible image cannot be obtained. On the contrary, an infrared image for depicting thermal radiation of an object can effectively resist these interferences. Based on this, in some embodiments, the imaging element C may also be an infrared (IR) camera for capturing the face image of the user. In this case, the above step: capturing a face image of a user in real time, and determining three dimensional coordinates of the center of the pupil under a camera coordinate system based on the face image may be implemented specifically through steps shown in FIG. 5.

S1011', the face image of the user is obtained in real time by using an infrared camera.

S1012', a plurality of first edge points of the iris in the face image are extracted, ellipse fitting is performed on the plurality of first edge points, and two dimensional coordinates of an ellipse center obtained by fitting under the image coordinate system are used as two dimensional coordinates of the center of the pupil under the image coordinate system.

S1013', a plurality of face feature points in the face image are obtained, and the plurality of face feature points are mapped to the same position on a pre-established three dimensional face model. Optionally, the face feature points are points capable of reflecting face features such as eyebrows, eyes, nose, mouth and face contour.

S1014', a coordinate system of the three dimensional face model is adjusted to coincide with the camera coordinate system. Optionally, a rotational vector and a translation vector from the coordinate system of the three dimensional face model to the camera coordinate system may be obtained based on a PnP pose measurement method, coordinate axes x, y and z of the coordinate system of the three dimensional face model are rotated according to the obtained rotational vector, an origin of the coordinate system of the three dimensional face model is translated according to the obtained translation vector, and then the coordinate system of the three dimensional face model may coincide with the camera coordinate system.

S1015', representative data such as a mean value or a mode number of depth coordinates of a plurality of second edge points of human eyes in the three dimensional face model under the camera coordinate system is used as depth coordinates of the center of the pupil under the camera coordinate system.

S1016', the two dimensional coordinates of the center of the pupil under the image coordinate system are transformed to be two dimensional coordinates of the center of the pupil under the camera coordinate system, the two dimensional coordinates of the center of the pupil under the camera coordinate system and the depth coordinates of the center of the pupil under the camera coordinate system constituting the three dimensional coordinates of the center of the pupil under the camera coordinate system. Each camera has camera internal parameters (for example, parameters of an optical center, a focal length and the like), two dimensional coordinates (namely, coordinates x and y) of each point in an image shot by the camera under the image coordinate system may be transformed to be two dimensional coordinates (namely, coordinates x and y) in the same dimension under the camera coordinate system with reference to the camera internal parameters.

Figure 6:
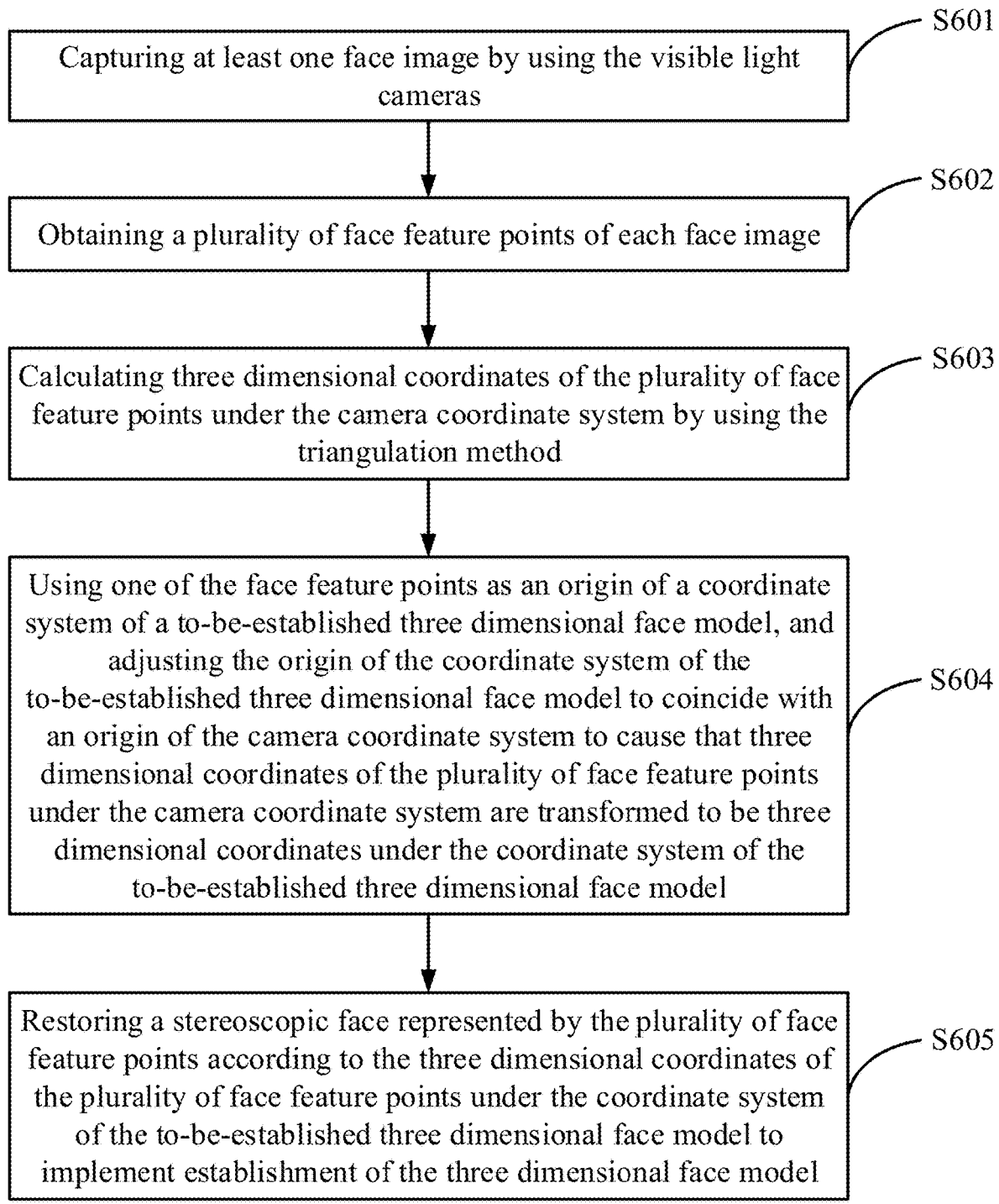
FIG. 6 is a flowchart of establishing a three dimensional face model provided by an embodiment of the present disclosure.

In some embodiments, in the above driving method provided by the embodiment of the present disclosure, as shown in FIG. 6, establishing a three dimensional face model may be implemented specifically in the following mode.

S601, at least one face image is captured by using the visible light cameras. In some embodiments, a plurality of frames of face images may be captured through two visible light cameras.

S602, a plurality of face feature points of each face image are obtained.

S603, three dimensional coordinates of the plurality of face feature points under the camera coordinate system are calculated by using the triangulation method.

S604, one of the face feature points (such as a nose tip and the pupil) is used as an origin of a coordinate system of a to-be-established three dimensional face model, and the origin of the coordinate system of the to-be-established three dimensional face model may be adjusted to coincide with an origin of the camera coordinate system through the PnP pose measurement method, such that three dimensional coordinates of the plurality of face feature points under the camera coordinate system are transformed to be three dimensional coordinates under the coordinate system of the to-be-established three dimensional face model.

S605, a stereoscopic face represented by the plurality of face feature points are restored according to the three dimensional coordinates of the plurality of face feature points under the coordinate system of the to-be-established three dimensional face model to implement establishment of the three dimensional face model.

In some embodiments, in the above driving method provided by the embodiment of the present disclosure, as shown in FIG. 7, establishing correspondence between positions of the center of the pupil and positions of a light-transmitting region in the liquid crystal grating may be implemented specifically in the following mode.

S701, a coordinate system of the liquid crystal grating is established by using a center of the liquid crystal grating as an origin of coordinates, a light emergent direction (equivalent to a Z-axis positive direction of the camera coordinate system) of the liquid crystal grating as a Z-axis positive direction, and an X-axis negative direction of the camera coordinate system as an X-axis positive direction, as shown in FIG. 8. The liquid crystal grating is located between the liquid crystal panel and a backlight source, D is the best viewing distance from human eyes to the liquid crystal panel, h is a gap between the liquid crystal panel and the liquid crystal grating in the best viewing distance in view of a refractive index, the center of the liquid crystal grating coincides approximately with a center of the liquid crystal panel (namely, coincide exactly or within an error range caused by factors such as alignment and measurement), and the light emergent direction of the liquid crystal grating is a direction of pointing to the liquid crystal panel from the liquid crystal grating.

S702, light-transmitting regions in different positions in the liquid crystal grating corresponding to different positions of the center of the pupil are determined under the coordinate system of the liquid crystal grating.

In some embodiments, in the above driving method provided by the embodiment of the present disclosure, the step S102: determining a position of a light-transmitting region, that corresponds to the real-time position, in the liquid crystal grating according to the real-time position, and a pre-established correspondence between positions of the center of the pupil and positions of a light-transmitting region in the liquid crystal grating may include the following steps specifically, as shown in FIG. 9.

S901, a negative value of a coordinate x of the center of the pupil under the camera coordinate system determined in real time is used as a coordinate x of the center of the pupil under the coordinate system of the liquid crystal grating, and a coordinate z of the center of the pupil under the camera coordinate system determined in real time is used as a coordinate z of the center of the pupil under the coordinate system of the liquid crystal grating, so transformation of coordinates of the center of the pupil from the camera coordinate system to the coordinate system of the liquid crystal grating is implemented.

Figure 10:
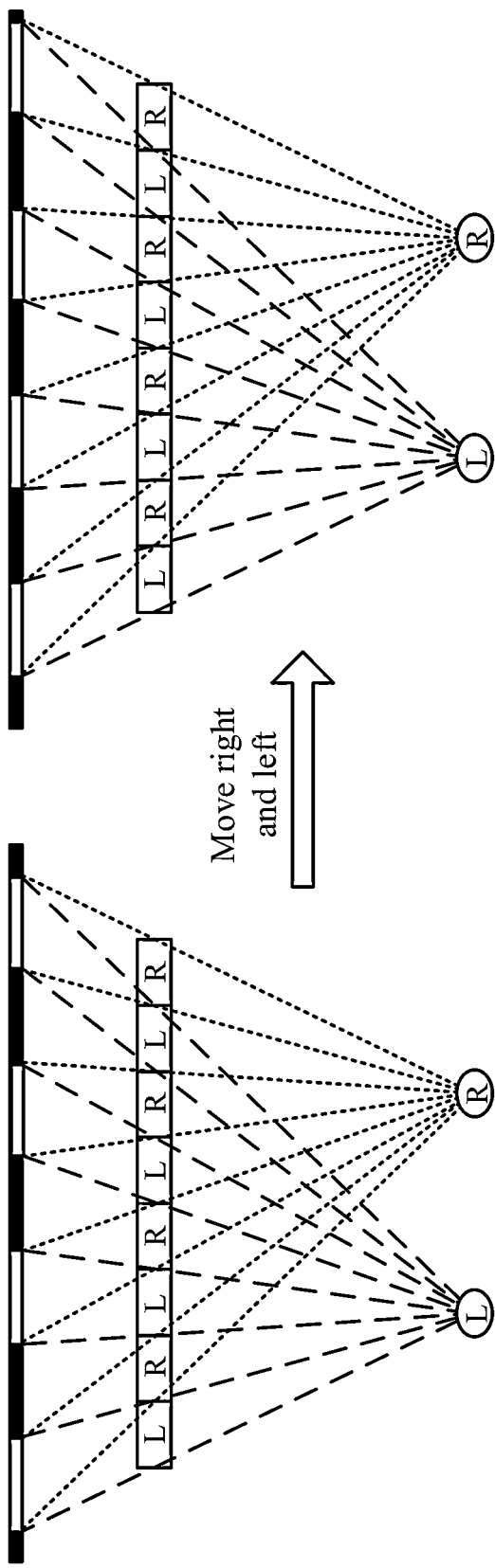
FIG. 10 is a schematic diagram of leftwards moving a position of a light-transmitting region according to a real-time position of a center of a pupil provided by an embodiment of the present disclosure.
Figure 11:
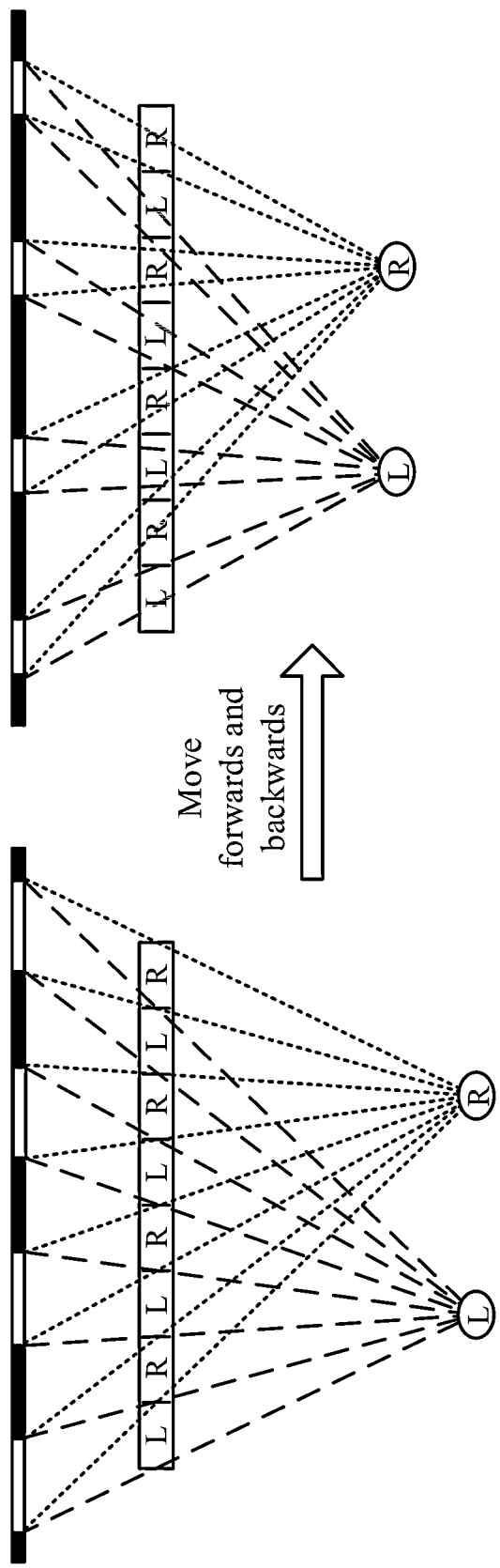
FIG. 11 is a schematic diagram of reducing a size of a light-transmitting region according to a real-time position of a center of a pupil provided by an embodiment of the present disclosure.

S902, whether the coordinate z of the center of the pupil under the coordinate system of the liquid crystal grating is equal to a preset best viewing distance D is judged; if yes, it may be determined that the human eyes are moved right and left on an X axis (FIG. 10 shows moving human eyes leftwards), the light-transmitting region needs to be moved in an X-axis direction of the coordinate system of the liquid crystal grating (FIG. 10 shows moving the light-transmitting region leftwards), a size of the light-transmitting region after moving is the same as a size of the light-transmitting region before moving, for example, whole light transmittance of the light-transmitting region in the liquid crystal grating is 50%, and sizes of the light-transmitting regions are the same; and if not, it may be determined that the human eyes are moved forwards and backwards on a Y axis (FIG. 11 shows moving the human eyes forwards to approach the liquid crystal panel), a size of the light-transmitting region is adjusted in the X-axis direction of the coordinate system of the liquid crystal grating (FIG. 11 shows reducing the light-transmitting region), and the light-transmitting region after adjusting overlaps partially with the light-transmitting region before adjusting.

In some embodiments, in the above driving method provided by the embodiment of the present disclosure, the moving the light-transmitting region in an X-axis direction of the coordinate system of the liquid crystal grating may be implemented in the following mode.

Coordinates of an intersection point between a connecting line extending line of a coordinate point of the center of the pupil and an origin under the coordinate system of the liquid crystal grating, and the liquid crystal grating are detected; and a coordinate x ($x_{open}$) of the coordinates of the intersection point is compared with a same-side (for example, left side or right side) endpoint coordinate of each strip electrode on an X axis in the liquid crystal grating within one period, and a region where an $i^{th}$ to $[(i+n/2)-1]^{th}$ strip electrodes within each period is located is determined as a light-transmitting region corresponding to a current center of the pupil in the case that the coordinate x ($x_{open}$) of the coordinates of the intersection point is greater than an endpoint coordinate $x_{i-1}$ of a $(i-1)^{th}$ strip electrode within one period and less than or equal to an endpoint coordinate $x_i$ of an $i^{th}$ strip electrode, n being the total number of strip electrodes within one period and being an even number, and i being an integer greater than or equal to 2 and less than or equal to n/2.

In the plurality of strip electrodes in the liquid crystal grating, n strip electrodes are used as one period, the strip electrodes of the corresponding ordinal number in all the periods are connected together, so light-transmitting conditions of the liquid crystal grating within each period are the same, and it is only required to calculate voltage loading conditions of the strip electrodes within one period. Taking a center of a left eye pupil as an example, a connecting line of the coordinate point of the center of the left eye pupil under the coordinate system of the liquid crystal grating and the origin of the coordinate system of the liquid crystal grating extends to intersect with the liquid crystal grating, a left endpoint coordinate $x_i$ of each strip electrode on the X-axis direction and a coordinate $x_{open}$ of this point are compared, and if $x_{i-1} < x_{open} \leq x_i$, it may be known that positions from the $i^{th}$ strip electrode to the $((i+n/2)-1)^{th}$ strip electrode within one period need to be set in a light-transmitting state.

Figure 12:
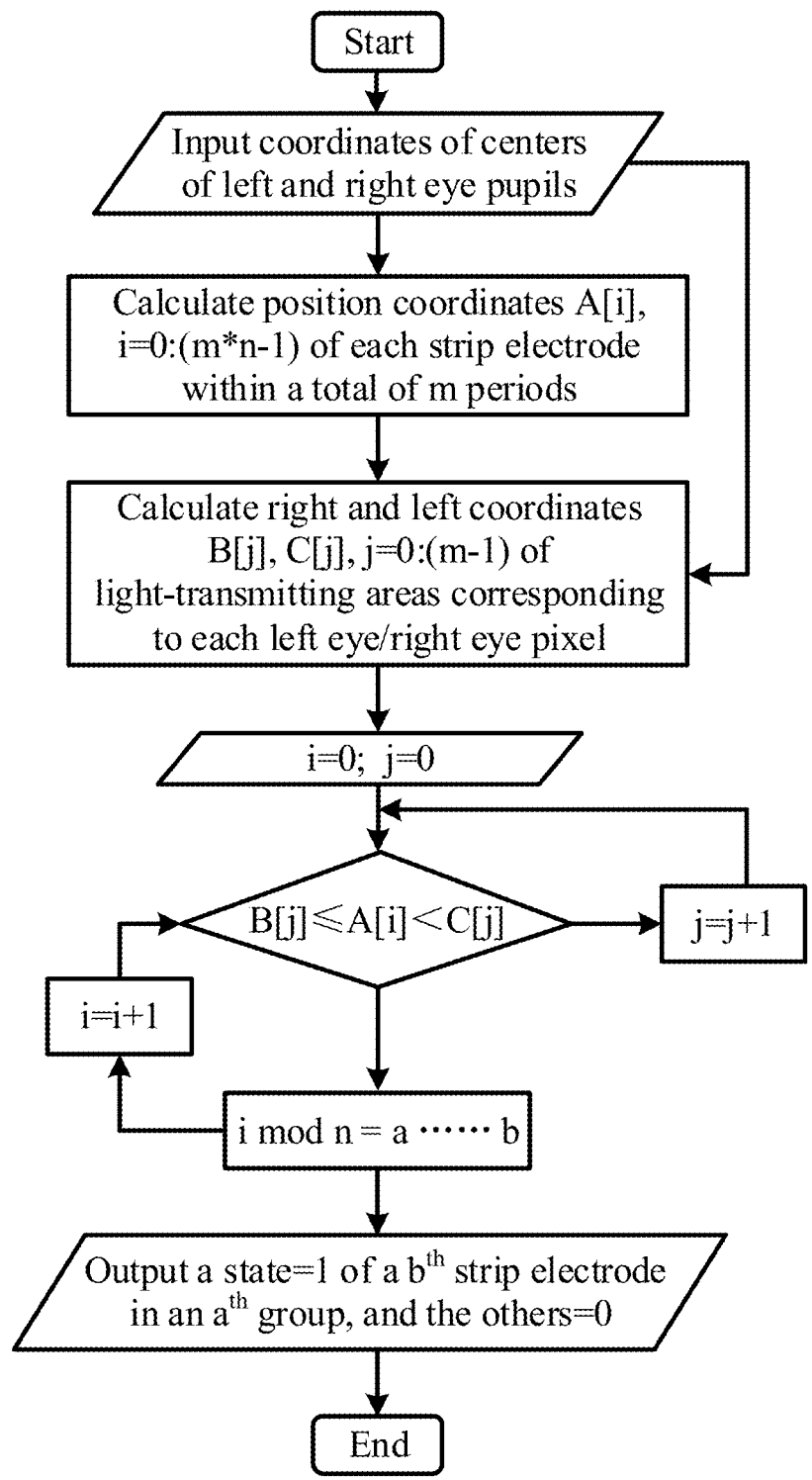
FIG. 12 is a flowchart of adjusting a size of a light-transmitting region provided by an embodiment of the present disclosure.

In some embodiments, in the above driving method provided by the embodiment of the present disclosure, the adjusting a size of the light-transmitting region in an X-axis direction of the coordinate system of the liquid crystal grating may be implemented in the following mode, as shown in FIG. 12.

Position coordinates of each strip electrode on an X axis within a total of m periods, a coordinate range on the X axis of a light transmittable region corresponding to each left eye pixel in the liquid crystal grating, and a coordinate range on the X axis of a light transmittable region corresponding to each right eye pixel in the liquid crystal grating are calculated; and position coordinates of a $b^{th}$ strip electrode within an $a^{th}$ period are compared with the coordinate range of the light transmittable region corresponding to the left eye pixel and the coordinate range of the light transmittable region corresponding to the right eye pixel, and a region where the $b^{th}$ strip electrode within the $a^{th}$ period is located is determined as a light-transmitting region corresponding to a current center of the pupil in the case that the position coordinates of the $b^{th}$ strip electrode within the $a^{th}$ period are located in both the coordinate range of the light transmittable region corresponding to the left eye pixel and the coordinate range of the light transmittable region corresponding to the right eye pixel, namely, the position coordinates of the $b^{th}$ strip electrode within the $a^{th}$ period are located in an intersection set between the coordinate range of the light transmittable region corresponding to the left eye pixel and the coordinate range of the light transmittable region corresponding to the right eye pixel, m being the total number of grating periods in the liquid crystal grating, a being an integer greater than or equal to 1 and less than or equal to m, and b being an integer greater than or equal to 1 and less than or equal to n.

Based on the same inventive concept, an embodiment of the present disclosure further provides a display apparatus, including a backlight source, a liquid crystal panel located on a light emergent side of the backlight source, and a liquid crystal grating located between the backlight source and the liquid crystal panel, the liquid crystal grating being driven by using the above driving method provided by the embodiment of the present disclosure. As a principle of solving problems of the display apparatus is similar to a principle of solving problems of the above driving method, implementation of the display apparatus provided by the embodiment of the present disclosure may refer to implementation of the above driving method provided by the embodiment of the present disclosure, and repetitions are omitted.

In some embodiments, the above display apparatus provided by the embodiment of the present disclosure may be: a mobile phone, a tablet computer, a television, a display, a notebook computer, a digital photo frame, a navigator, a smartwatch, a fitness wristband, a personal digital assistant and any other product or component with a display function.

The display apparatus includes but is not limited to: a radio frequency unit, a network module, an audio output and input unit, a sensor, a display unit, a user input unit, an interface unit, a memory, a processor, a power source and the like. Besides, those skilled in the art can understand the above structure does not constitute limitation on the display apparatus provided by the embodiment of the present disclosure, in other words, the above display apparatus provided by the embodiment of the present disclosure may include more or less components than the above, or a combination of some components, or different arrangements of components.

Based on the same inventive concept, an embodiment of the present disclosure further provides a display method for the above display apparatus, including the following steps: a liquid crystal grating is controlled to transmit light completely in a two dimensional display mode; and the liquid crystal grating is controlled to form a light-transmitting region and a light-shading region that are distributed alternately by using the above driving method provided by the embodiment of the present disclosure in a three dimensional display mode.

In some embodiments, in the three dimensional display mode, backlight is blocked inevitably by the light-shading region in the liquid crystal grating, which causes decreasing of a screen brightness, and when the human eyes are moved forwards (namely, moving in a direction towards approaching the liquid crystal panel), the light-transmitting region of the liquid crystal grating is reduced, the screen brightness will be lower. Therefore, for ensuring the screen brightness, a backlight brightness needs to be increased. Optionally, in the present disclosure, while the size of the light-transmitting region is adjusted in the X-axis direction of the coordinate system of the liquid crystal grating, the total number of the strip electrodes corresponding to the light-transmitting region may be determined, the backlight brightness emitted by the backlight source is adjusted based on the total number of strip electrodes, the backlight brightness is in a negative correlation with the total number of strip electrodes, namely, the smaller the light-transmitting region is, the less the number of strip electrodes is, and the greater the backlight brightness needs to be improved.

Apparently, those skilled in the art can make various modifications and variations to the embodiments of the present disclosure without departing from the spirit and scope of the embodiments of the present disclosure. In this case, if these modifications and variations of the embodiments of the present disclosure fall within the scope of the claims of the present disclosure and their equivalents, the present disclosure is also intended to include these modifications and variations.

What is claimed is:

1. A driving method for a liquid crystal grating, comprising:
   determining a real-time position of a center of a pupil;
   determining a position of a light-transmitting region, that corresponds to the real-time position, in the liquid crystal grating according to the real-time position, and a pre-established correspondence between positions of the center of the pupil and positions of a light-transmitting region in the liquid crystal grating; and
   driving the liquid crystal grating to cause that the liquid crystal grating only transmits light at the position of the light-transmitting region that corresponds to the real-time position;
   wherein the determining a real-time position of a center of a pupil comprises: capturing a face image of a user in real time, and determining three dimensional coordinates of the center of the pupil under a camera coordinate system based on the face image;

wherein the capturing a face image of a user in real time, and determining three dimensional coordinates of the center of the pupil under a camera coordinate system based on the face image comprises:

obtaining the face image of the user in real time by using an infrared camera;

extracting a plurality of first edge points of an iris in the face image, performing ellipse fitting on the plurality of first edge points, and using two dimensional coordinates of an ellipse center obtained by fitting under an image coordinate system as two dimensional coordinates of the center of the pupil under the image coordinate system;

obtaining a plurality of face feature points in the face image, and mapping the plurality of face feature points to the same positions on a pre-established three dimensional face model;

adjusting a coordinate system of the three dimensional face model to coincide with the camera coordinate system;

using a mean value or a mode number of depth coordinates of a plurality of second edge points of human eyes in the three dimensional face model under the camera coordinate system as depth coordinates of the center of the pupil under the camera coordinate system; and transforming the two dimensional coordinates of the center of the pupil under the image coordinate system to be two dimensional coordinates of the center of the pupil in the same dimension under the camera coordinate system, the two dimensional coordinates of the center of the pupil under the camera coordinate system and the depth coordinates of the center of the pupil under the camera coordinate system constituting the three dimensional coordinates of the center of the pupil under the camera coordinate system.

2. The driving method according to claim 1, wherein the capturing a face image of a user in real time, and determining three dimensional coordinates of the center of the pupil under a camera coordinate system based on the face image comprises:

capturing face images in real time respectively by using visible light cameras that are located in different positions;

respectively extracting a plurality of first edge points of an iris in the face images captured simultaneously by the visible light cameras, and performing matching on the first edge points at the same positions in the face images;

calculating three dimensional coordinates of successfully matched first edge points under the camera coordinate system by using a triangulation method; and using the three dimensional coordinates of a center of a mapping space of the first edge points under the camera coordinate system as the three dimensional coordinates of the center of the pupil under the camera coordinate system.

3. The driving method according to claim 2, wherein establishing a three dimensional face model comprises:

capturing at least one face image by using the visible light cameras;

obtaining a plurality of face feature points of each face image;

calculating three dimensional coordinates of the plurality of face feature points under the camera coordinate system by using the triangulation method;

using one of the face feature points as an origin of a coordinate system of a to-be-established three dimensional face model, and adjusting the origin of the coordinate system of the to-be-established three dimensional face model to coincide with an origin of the camera coordinate system to cause that three dimensional coordinates of the plurality of face feature points under the camera coordinate system are transformed to be three dimensional coordinates under the coordinate system of the to-be-established three dimensional face model; and restoring a stereoscopic face represented by the plurality of face feature points according to the three dimensional coordinates of the plurality of face feature points under the coordinate system of the to-be-established three dimensional face model to implement establishment of the three dimensional face model.

4. The driving method according to claim 1, wherein establishing correspondence between positions of the center of the pupil and positions of a light-transmitting region in the liquid crystal grating comprises:

establishing a coordinate system of the liquid crystal grating by using a center of the liquid crystal grating as an origin of coordinates, a light emergent direction of the liquid crystal grating as a Z-axis positive direction, and an X-axis negative direction of the camera coordinate system as an X-axis positive direction; and determining light-transmitting regions in different positions in the liquid crystal grating corresponding to different positions of the center of the pupil under the coordinate system of the liquid crystal grating.

5. The driving method according to claim 4, wherein the determining a position of a light-transmitting region, that corresponds to the real-time position, in the liquid crystal grating according to the real-time position, and a pre-established correspondence between positions of the center of the pupil and positions of a light-transmitting region in the liquid crystal grating comprises:

using a negative value of a coordinate x of the center of the pupil under the camera coordinate system determined in real time as a coordinate x of the center of the pupil under the coordinate system of the liquid crystal grating, and a coordinate z of the center of the pupil under the camera coordinate system determined in real time as a coordinate z of the center of the pupil under the coordinate system of the liquid crystal grating; and judging whether the coordinate z of the center of the pupil under the coordinate system of the liquid crystal grating is equal to a preset best viewing distance; if yes, moving the light-transmitting region in an X-axis direction of the coordinate system of the liquid crystal grating, a size of the light-transmitting region after moving being the same as a size of the light-transmitting region before moving; if not, adjusting a size of the light-transmitting region in the X-axis direction of the coordinate system of the liquid crystal grating, the light-transmitting region after adjusting overlapping partially with the light-transmitting region before adjusting.

6. The driving method according to claim 5, wherein the moving the light-transmitting region in an X-axis direction of the coordinate system of the liquid crystal grating comprises:

detecting coordinates of an intersection point between a connecting line extending line of a coordinate point of the center of the pupil and an origin under the coordinate system of the liquid crystal grating, and the liquid crystal grating; and comparing a coordinate x of the coordinates of the intersection point with a same-side endpoint coordinate of each strip electrode on an X axis in the liquid crystal grating within one period, and determining a region where an $i^{th}$ to $[(i+n/2)-1]^{th}$ strip electrodes within each period is located as a light-transmitting region corresponding to a current center of the pupil in a case that the coordinate x of the coordinates of the intersection point is greater than an endpoint coordinate of an $(i-1)^{th}$ strip electrode within one period and less than or equal to an endpoint coordinate of an $i^{th}$ strip electrode, n being the total number of strip electrodes within one period and being an even number, and i being an integer greater than or equal to 2 and less than or equal to n/2.

7. The driving method according to claim 5, wherein the adjusting a size of the light-transmitting region in the X-axis direction of the coordinate system of the liquid crystal grating comprises:

calculating position coordinates of each strip electrode on an X axis within a total of m periods, a coordinate range on the X axis of a light transmittable region corresponding to each left eye pixel in the liquid crystal grating, and a coordinate range on the X axis of a light transmittable region corresponding to each right eye pixel in the liquid crystal grating; and comparing position coordinates of a $b^{th}$ strip electrode within an $a^{th}$ period with the coordinate range of the light transmittable region corresponding to the left eye pixel and the coordinate range of the light transmittable region corresponding to the right eye pixel, and determining a region where the $b^{th}$ strip electrode within the $a^{th}$ period is located as a light-transmitting region corresponding to a current center of the pupil in the case that the position coordinates of the $b^{th}$ strip electrode within the $a^{th}$ period are located in both the coordinate range of the light transmittable region corresponding to the left eye pixel and the coordinate range of the light transmittable region corresponding to the right eye pixel, m being the total number of grating periods in the liquid crystal grating, a being an integer greater than or equal to 1 and less than or equal to m, and b being an integer greater than or equal to 1 and less than or equal to n.

8. A display apparatus, comprising: a backlight source, a liquid crystal panel located on a light emergent side of the backlight source, and a liquid crystal grating located between the backlight source and the liquid crystal panel, the liquid crystal grating being driven by using the driving method according to claim 1.

9. A display method for the display apparatus according to claim 8, comprising:

controlling a liquid crystal grating to transmit light completely in a two dimensional display mode; and controlling the liquid crystal grating to form a light-transmitting region and a light-shading region that are distributed alternately by using a driving method in a three dimensional display mode, wherein the driving method comprises:

determining a real-time position of a center of a pupil;

determining a position of a light-transmitting region, that corresponds to the real-time position, in the liquid crystal grating according to the real-time position, and a pre-established correspondence between positions of the center of the pupil and positions of a light-transmitting region in the liquid crystal grating; and driving the liquid crystal grating to cause that the liquid crystal grating only transmits light at the position of the light-transmitting region that corresponds to the real-time position;

wherein the determining a real-time position of a center of a pupil comprises: capturing a face image of a user in real time, and determining three dimensional coordinates of the center of the pupil under a camera coordinate system based on the face image;

wherein the capturing a face image of a user in real time, and determining three dimensional coordinates of the center of the pupil under a camera coordinate system based on the face image comprises:

obtaining the face image of the user in real time by using an infrared camera;

extracting a plurality of first edge points of an iris in the face image, performing ellipse fitting on the plurality of first edge points, and using two dimensional coordinates of an ellipse center obtained by fitting under an image coordinate system as two dimensional coordinates of the center of the pupil under the image coordinate system;

obtaining a plurality of face feature points in the face image, and mapping the plurality of face feature points to the same positions on a pre-established three dimensional face model;

adjusting a coordinate system of the three dimensional face model to coincide with the camera coordinate system;

using a mean value or a mode number of depth coordinates of a plurality of second edge points of human eyes in the three dimensional face model under the camera coordinate system as depth coordinates of the center of the pupil under the camera coordinate system; and transforming the two dimensional coordinates of the center of the pupil under the image coordinate system to be two dimensional coordinates of the center of the pupil in the same dimension under the camera coordinate system, the two dimensional coordinates of the center of the pupil under the camera coordinate system and the depth coordinates of the center of the pupil under the camera coordinate system constituting the three dimensional coordinates of the center of the pupil under the camera coordinate system.

10. The display method according to claim 9, wherein while adjusting a size of the light-transmitting region in an X-axis direction of a coordinate system of the liquid crystal grating, the display method further comprises:

determining a total number of strip electrodes corresponding to the light-transmitting region, and adjusting a backlight brightness emitted by a backlight source based on the total number of strip electrodes, and the backlight brightness being in a negative correlation with the total number of strip electrodes.

11. The display method according to claim 9, wherein the capturing a face image of a user in real time, and determining three dimensional coordinates of the center of the pupil under a camera coordinate system based on the face image comprises:

capturing face images in real time respectively by using visible light cameras that are located in different positions;

respectively extracting a plurality of first edge points of an iris in the face images captured simultaneously by the visible light cameras, and performing matching on the first edge points at the same positions in the face images;

calculating three dimensional coordinates of successfully matched first edge points under the camera coordinate system by using a triangulation method; and using the three dimensional coordinates of a center of a mapping space of the first edge points under the camera coordinate system as the three dimensional coordinates of the center of the pupil under the camera coordinate system.

12. The display method according to claim 11, wherein establishing a three dimensional face model comprises:

capturing at least one face image by using the visible light cameras;

obtaining a plurality of face feature points of each face image;

calculating three dimensional coordinates of the plurality of face feature points under the camera coordinate system by using the triangulation method;

using one of the face feature points as an origin of a coordinate system of a to-be-established three dimensional face model, and adjusting the origin of the coordinate system of the to-be-established three dimensional face model to coincide with an origin of the camera coordinate system to cause that three dimensional coordinates of the plurality of face feature points under the camera coordinate system are transformed to be three dimensional coordinates under the coordinate system of the to-be-established three dimensional face model; and restoring a stereoscopic face represented by the plurality of face feature points according to the three dimensional coordinates of the plurality of face feature points under the coordinate system of the to-be-established three dimensional face model to implement establishment of the three dimensional face model.

13. The display method according to claim 9, wherein establishing correspondence between positions of the center of the pupil and positions of a light-transmitting region in the liquid crystal grating comprises:

establishing a coordinate system of the liquid crystal grating by using a center of the liquid crystal grating as an origin of coordinates, a light emergent direction of the liquid crystal grating as a Z-axis positive direction, and an X-axis negative direction of the camera coordinate system as an X-axis positive direction; and determining light-transmitting regions in different positions in the liquid crystal grating corresponding to different positions of the center of the pupil under the coordinate system of the liquid crystal grating.

14. The display method according to claim 13, wherein the determining a position of a light-transmitting region, that corresponds to the real-time position, in the liquid crystal grating according to the real-time position, and a pre-established correspondence between positions of the center of the pupil and positions of a light-transmitting region in the liquid crystal grating comprises:

using a negative value of a coordinate x of the center of the pupil under the camera coordinate system determined in real time as a coordinate x of the center of the pupil under the coordinate system of the liquid crystal grating, and a coordinate z of the center of the pupil under the camera coordinate system determined in real time as a coordinate z of the center of the pupil under the coordinate system of the liquid crystal grating; and judging whether the coordinate z of the center of the pupil under the coordinate system of the liquid crystal grating is equal to a preset best viewing distance; if yes, moving the light-transmitting region in an X-axis direction of the coordinate system of the liquid crystal grating, a size of the light-transmitting region after moving being the same as a size of the light-transmitting region before moving; if not, adjusting a size of the light-transmitting region in the X-axis direction of the coordinate system of the liquid crystal grating, the light-transmitting region after adjusting overlapping partially with the light-transmitting region before adjusting.

15. The display method according to claim 14, wherein the moving the light-transmitting region in an X-axis direction of the coordinate system of the liquid crystal grating comprises:

detecting coordinates of an intersection point between a connecting line extending line of a coordinate point of the center of the pupil and an origin under the coordinate system of the liquid crystal grating, and the liquid crystal grating; and comparing a coordinate x of the coordinates of the intersection point with a same-side endpoint coordinate of each strip electrode on an X axis in the liquid crystal grating within one period, and determining a region where an $i^{th}$ to $[(i+n/2)-1]^{th}$ strip electrodes within each period is located as a light-transmitting region corresponding to a current center of the pupil in a case that the coordinate x of the coordinates of the intersection point is greater than an endpoint coordinate of an $(i-1)^{th}$ strip electrode within one period and less than or equal to an endpoint coordinate of an $i^{th}$ strip electrode, n being the total number of strip electrodes within one period and being an even number, and i being an integer greater than or equal to 2 and less than or equal to n/2.

16. The display method according to claim 14, wherein the adjusting a size of the light-transmitting region in the X-axis direction of the coordinate system of the liquid crystal grating comprises:

calculating position coordinates of each strip electrode on an X axis within a total of m periods, a coordinate range on the X axis of a light transmittable region corresponding to each left eye pixel in the liquid crystal grating, and a coordinate range on the X axis of a light transmittable region corresponding to each right eye pixel in the liquid crystal grating; and comparing position coordinates of a $b^{th}$ strip electrode within an $a^{th}$ period with the coordinate range of the light transmittable region corresponding to the left eye pixel and the coordinate range of the light transmittable region corresponding to the right eye pixel, and determining a region where the $b^{th}$ strip electrode within the $a^{th}$ period is located as a light-transmitting region corresponding to a current center of the pupil in the case that the position coordinates of the $b^{th}$ strip electrode within the $a^{th}$ period are located in both the coordinate range of the light transmittable region corresponding to the left eye pixel and the coordinate range of the light transmittable region corresponding to the right eye pixel, m being the total number of grating periods in the liquid crystal grating, a being an integer greater than or equal to 1 and less than or equal to m, and b being an integer greater than or equal to 1 and less than or equal to n.

* * * * *